US006464040B1

United States Patent
Hallmann et al.

(10) Patent No.: US 6,464,040 B1
(45) Date of Patent: Oct. 15, 2002

(54) HIGH SPEED GEAR WITH OIL LUBRICATION, ESPECIALLY FOR ENVIRONMENTALLY SEALED RAILWAY DRIVING MECHANISM

(75) Inventors: Dieter Hallmann, Berlin; Erwin Skumawitz, Schönwalde, both of (DE)

(73) Assignee: DaimlerChrysler Rail Systems GmbH, Berlin (DE)

( * ) Notice: Subject to any disclaimer, the term of this patent is extended or adjusted under 35 U.S.C. 154(b) by 0 days.

(21) Appl. No.: 09/743,033

(22) PCT Filed: Jun. 18, 1999

(86) PCT No.: PCT/EP99/04156

§ 371 (c)(1),
(2), (4) Date: Mar. 21, 2001

(87) PCT Pub. No.: WO00/01964

PCT Pub. Date: Jan. 13, 2000

(30) Foreign Application Priority Data

Jul. 4, 1998 (DE) .......................... 198 31 208

(51) Int. Cl.[7] .......................... F16H 57/04; B61C 9/38; F16J 15/447
(52) U.S. Cl. .................. 184/6.12; 184/6.4; 184/108; 74/467; 74/606 R
(58) Field of Search .......................... 184/6.12, 6, 6.17, 184/6.4, 104.1, 6.28, 31, 3.1, 3.2, 108; 74/606 R, 467, 609; 476/8; 474/91; 277/402, 423, 412, 427, 429, 424, 590, 637, 419; 384/316, 433, 462, 468; 290/1 R; 415/174.5

(56) References Cited

U.S. PATENT DOCUMENTS

| | | | | |
|---|---|---|---|---|
| 1,813,819 A | * | 7/1931 | Ross | |
| 2,081,846 A | * | 5/1937 | Behrens | |
| 3,805,919 A | * | 4/1974 | Nakamura et al. | |
| 3,815,709 A | * | 6/1974 | Rosenthal | 184/6.28 |
| 4,603,865 A | * | 8/1986 | Bien | 74/606 R |
| 4,730,833 A | * | 3/1988 | Foster et al. | 74/606 R |
| 4,736,819 A | * | 4/1988 | Müller | 184/6.12 |
| 4,834,464 A | * | 5/1989 | Frehse | 184/6.25 |
| 4,995,971 A | * | 2/1991 | Droste et al. | 74/606 R |
| 5,092,196 A | * | 3/1992 | Kameda et al. | 184/6.12 |
| 5,181,585 A | * | 1/1993 | Braun et al. | 184/6.28 |
| 5,207,121 A | * | 5/1993 | Bien | 74/606 R |
| 5,839,985 A | * | 11/1998 | Teraoka | |
| 5,899,779 A | * | 5/1999 | Hattori | |
| 5,979,207 A | * | 11/1999 | Seidl et al. | 184/6.17 |
| 6,230,842 B1 | * | 5/2001 | Haeberer et al. | 184/6.12 |
| 6,318,501 B1 | * | 11/2001 | Vdou et al. | 184/6.12 |
| 6,343,794 B1 | * | 2/2002 | Brown | 277/423 |

FOREIGN PATENT DOCUMENTS

| | | | |
|---|---|---|---|
| DE | 4220754 | * | 1/1994 |
| DE | 42 44 684 A | | 1/1994 |
| DE | 4244685 | * | 1/1994 |
| DE | 19506866 | * | 10/1996 |
| DE | 19831208 | * | 5/1999 |
| DE | 19856941 | * | 2/2000 |
| DE | 10011063 | * | 9/2001 |
| WO | 0166983 | * | 9/2001 |

OTHER PUBLICATIONS

Antriebstechnik, vol. 33, No. 9, 1994, pp. 60–65.

* cited by examiner

*Primary Examiner*—Douglas C. Butler
(74) *Attorney, Agent, or Firm*—Venable; Norman N. Kunitz

(57) ABSTRACT

The invention relates to a high-speed gear with oil lubrication, with oil-recycling ducts (8) leading out of the labyrinth chambers of contactless shaft seals (6) to the crankcase (5) of the gear casing (3). According to the invention, the oil-recycling ducts (8) terminate in regions (10) in which a vacuum is automatically established during running operation, independently of the direction of rotation of the gear.

8 Claims, 3 Drawing Sheets

HIGH SPEED GEAR WITH OIL LUBRICATION, ESPECIALLY FOR ENVIRONMENTALLY SEALED RAILWAY DRIVING MECHANISM

BACKGROUND OF THE INVENTION

The invention relates to a high-speed gear with oil lubrication, especially for environmentally-sealed railway driving mechanisms, with oil-recycling ducts leading out of the labyrinth chambers of contactless shaft seals to the crankcase of the gear casing.

In the lubrication of modern, high-speed railway driving mechanisms, generally the teeth of the large wheel take up oil from the crankcase of the gear casing in the manner of splash lubrication during the startup process; the driving pinion is wetted and, due to its fractured structure, a fine oil-air mixture is formed as the rpm increases. This mixture is distributed in the entire gear, and thus also lubricates the bearings of the drive shafts in the gear casing.

Assuring a reliable, no-wear and extensively oil- and gas-tight seal toward the outside at the contactless shaft seals of these bearings poses a major problem for drives with high-speed, large gears. Usually, labyrinth seals whose function lies in throttling the pressure in the gap are used. The oil mist that condenses in the labyrinth chambers of the seals is continuously removed via a siphon system, and re-circulated into the closed gear casing, which is intended to prevent a significant amount of leaked oil from exiting via the external dirt-removal chambers of the labyrinth seals. The oil-recycling conduits are sloped for this purpose, and terminate above the crankcase.

In very high-speed gears, it appears that the oil-air mixture is carried along, as a so-called drag current, at virtually the same angular speed as the large wheel in the gear casing, and is warmed considerably due to inherent friction, thereby expanding. Consequently, it has a more pronounced effect on the labyrinth seals. This requires, among other things, highly-reliable oil recycling from the labyrinth chambers of the seals to prevent the escape of oil.

To reduce the frictional heat of the oil mist to a tolerable level, it is necessary to keep the quantity of oil in the gear casing as small as possible, and thus keep the viscosity of the oil-air mixture as low as possible, and to create the smoothest possible flow conditions in the gear casing. It must also be ensured, however, that the gear absolutely not be allowed to run dry, which would lead to jamming; therefore, it is imperative that a quantity of oil required for reliable operation be maintained at all times. Hence, the oil-supply tolerances are very tight, and must be monitored diligently.

Particularly for railway driving mechanisms, but also for other applicable, high-speed gears, it is an object to improve the manner in which oil is conveyed out of the gap seals in order to prevent leaked oil to the greatest possible extent, and to create a highly-reliable, that is, sensitive and position-tolerant, oil-supply display, without significantly disturbing the flow conditions in the gear casing.

SUMMARY OF THE INVENTION

According to the invention, this object generally is accomplished by a high-speed gear arrangement with oil lubrication, especially for environmentally-sealed railway driving mechanisms, with oil-recycling ducts leading out of the labyrinth chambers of contactless shaft seals to the crankcase of the gear casing or gear box, and wherein the ends of the oil-recycling ducts leading to the crankcase terminate in regions in which a relative vacuum is automatically established during running operation, independently of the direction of rotation of the gear arrangement, with the regions with a vacuum being formed by axial narrow points or constrictions between the tooth region of the large wheel of the gear arrangement and the bordering walls of the gear casing. Advantageous embodiments likewise are disclosed.

According to the invention, the Bernoulli effect is utilized during gear operation to generate a vacuum at the termination point of the oil-recycling ducts, which effectively supports the flow of oil from the labyrinth chambers of contactless shaft seals. According to Bernoulli, the static pressure in a fast-moving fluid is lower than in a non-moving or slower fluid; specifically, the larger the flow difference, the lower the static pressure. If the region of the gear casing through which the drag current passes is artificially narrowed, the speed of the drag current increases in this region, and the static pressure drops at this location relative to the entire system. If the oil-recycling ducts terminate in such a region, an eddy is formed in the oil-recycling ducts during operation, which essentially supports the flow-off of the coil that has condensed in the seal system.

The discussed arrangement has the same physical effect as a venturi nozzle, although it is specified for a different purpose. The narrow point is advantageously created in a region of the gear casing in which the highest speed of the drag current dominates, namely near the periphery of the large wheel. A particularly well-suited location is directly above the crankcase, utilizing the guide incline of the oil-recycling ducts. If the constricted areas are formed by material buildups in the walls of the gear casing in this region, these areas can advantageously also accommodate bores for the oil-recycling ducts from the large-wheel bearing. The material buildups are preferably embodied such that the change in the cross section of the drag current is effected in both directions of rotation with the least possible eddy formation. Furthermore, a float, which is visible through a viewing glass provided for checking the oil supply, can be seated in a directly-adjacent bore. With this arrangement of the float in the built-up region of the housing wall, the flow behavior of the oil-air mixture is not disturbed in either the narrow point or in further flow-sensitive regions; additionally, the complicated tubular guides for the float that would otherwise be necessary can be omitted. Moreover, the oil level is read in this region if, in an advantageous embodiment of the invention, it coincides with the center of gravity of the surface of the permissible oil-bath level, independently of the inclination of the gear casing, as stipulated by, for example, the inclination of the extension. The oil-recycling ducts terminating here ensure that a sufficient quantity of oil is available for the float when the gear is inoperative.

For additionally utilizing the eddy effect to convey the oil out of the bearing of the drive pinion, the oil-recycling lines of the pinion can likewise terminate in the artificially-narrowed region.

The embodiment of the gear according to the invention has a very low cost and space requirement, and production is non-problematic. The device itself is maintenance-free and requires no external power. With the exception of the float, which may or may not be used to raise the reading level, no mechanically-moved parts are required. Further advantageous embodiments ensue from the dependent claims.

The invention is described below by way of an exemplary embodiment.

DESCRIPTION OF THE PREFERRED EMBODIMENTS

Figure 1:
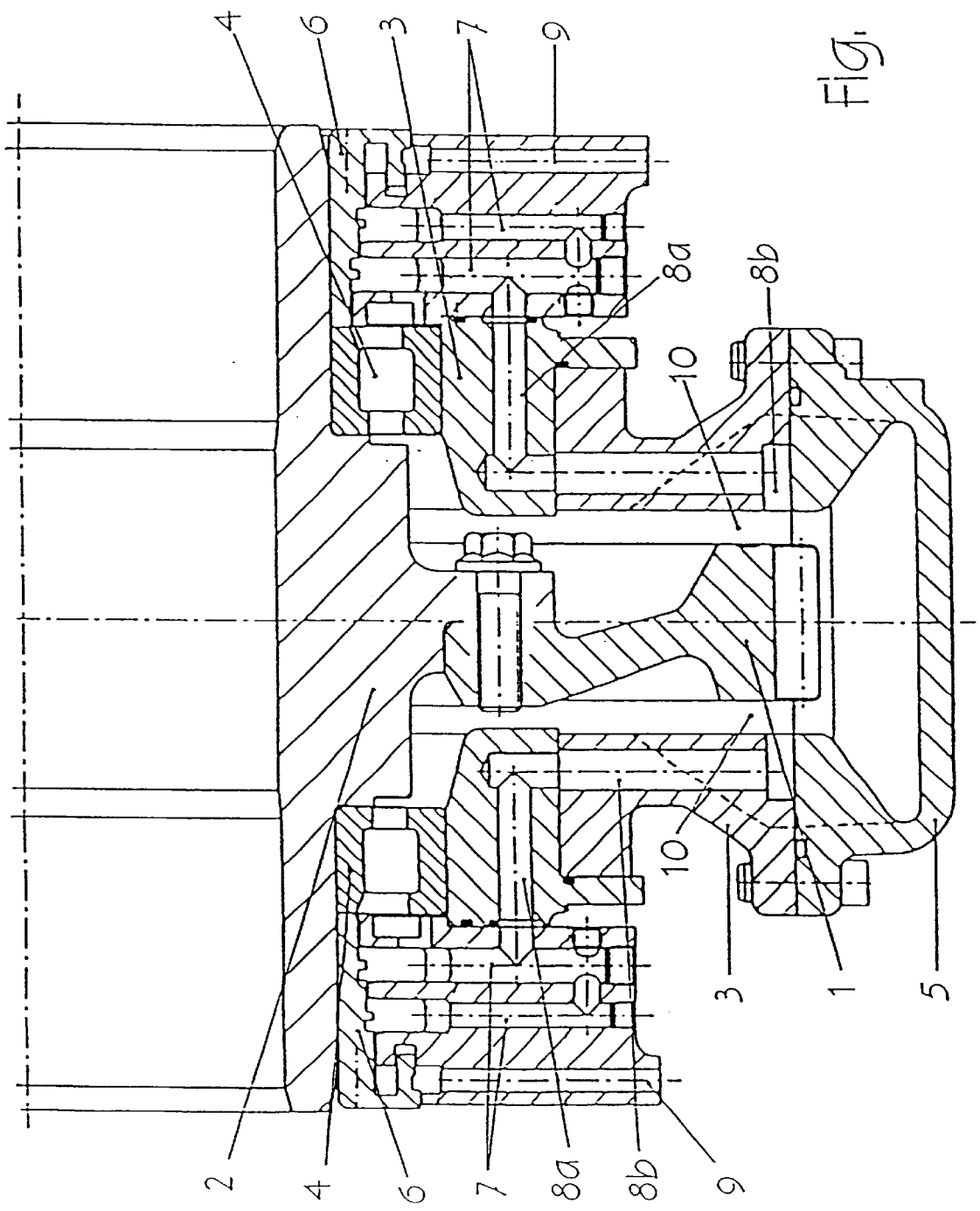
FIG. 1 shows a section I—I through the gear casing of a railway driving mechanism, in the plane of the large-wheel axle according to FIG. 3.
Figure 2:
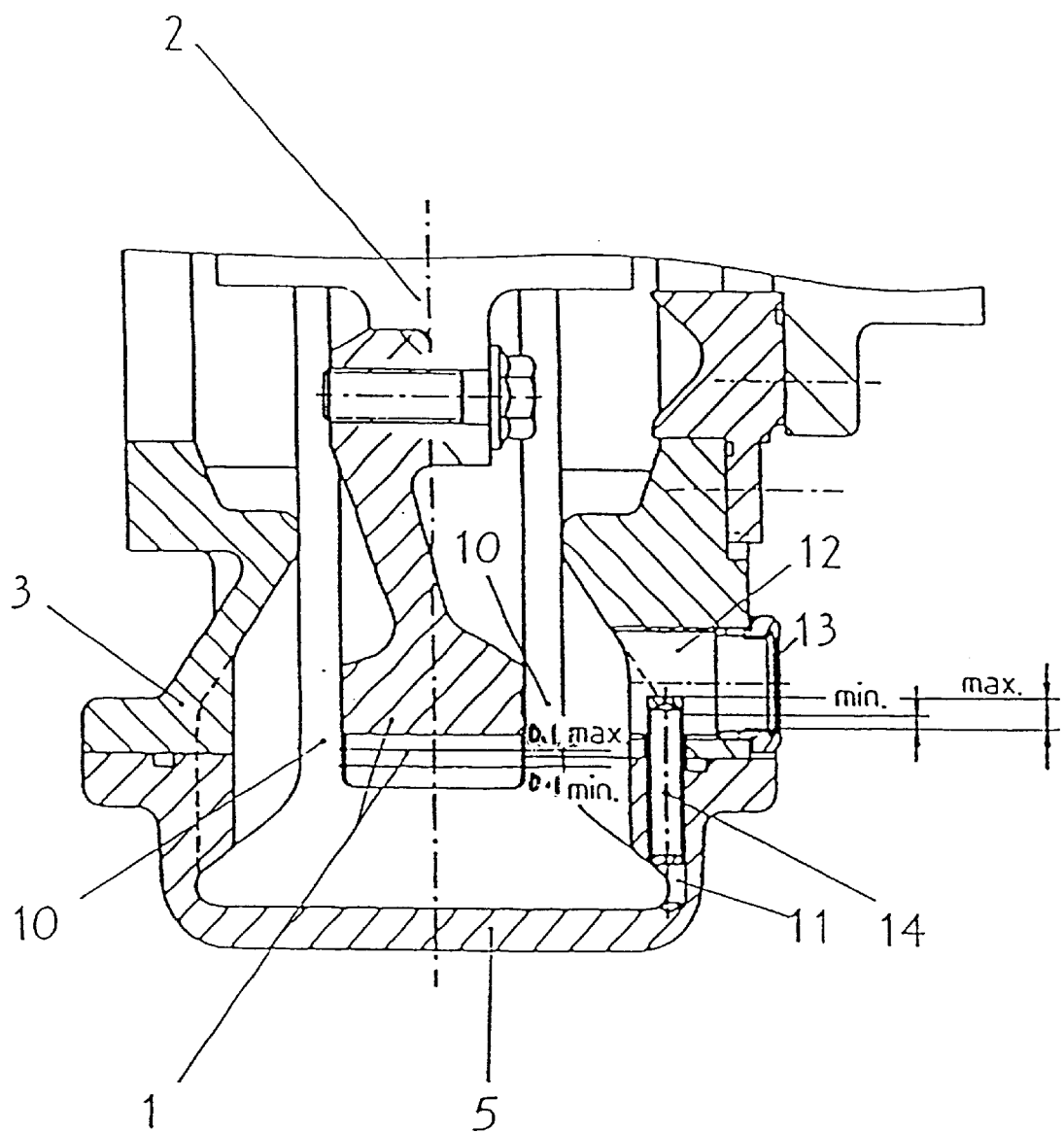
FIG. 2 shows a section II—II according to FIG. 3, parallel to section I—I, in the plane of the center of gravity of the oil level.

In FIGS. 1 and 2, 1 represents the large wheel of a railway driving mechanism, which is driven by a pinion, not shown in detail. The large wheel 1 is screwed to a large-wheel body 2, which is shrunken onto an axle shaft of a rail car, not shown in detail. The large wheel 1 and the driving pinion are seated on cylindrical roller bearings in a gear casing 3. The gear casing 3 ends at the bottom with a crankcase 5, which is filled with gear oil up to about the center of the teeth of the large wheel 1. Labyrinth seals 6 create the seal between the gear casing 3 and the large-wheel body 2. These contactless gap seals permit high relative speeds, and are wear-free in principle. It is not possible, however, to completely avoid leakage of the labyrinth seals 6 due to the oil-mist pressure that is established in high-speed operation, so leaked oil is filtered out by way of a siphon system 7 and returned nearly in its entirety to the crankcase 5 through oil-recycling ducts 8. only very small traces of oil that are no longer circulated are conveyed away, with dirt particles that have deposited externally, by way of the external dirt-removal chambers 9.

The contour of the gear casing 3, which is indicated in a dashed line in FIGS. 1 and 2, is optimal in terms of flow. This contour permits the drag current, comprising an oil-air mixture, to be carried along without friction or eddy currents, so the oil mist is not warmed excessively. In the region of the lowermost teeth and the tooth base of the large wheel 1, however, the contours of the side walls of the gear casing 3 are embodied such that narrowed regions 10 are formed. For this purpose, the housing wall is continuously thickened such that the inside walls of the gear casing 3 extend perpendicular to below the crankcase 5 in the region of the curve maximum of the material buildups, resulting in the desired narrowed points, narrowings or constrictions in the lower region of the gear rim and the tooth base of the large wheel 1.

An oil-recycling duct 8 of the large wheel 1 is embodied by a transverse bore 8a extending to the siphon system, and an adjoining, vertical bore 8b, the bores being cut into the material buildup of the housing walls. The vertical bore 8b terminates at the height of the lower tooth region of the large wheel 1, inside the curve maximum of the material buildup, that is, exactly in the region 10, in which the largest relative vacuum—in comparison to the entire system—is established within the closed gear casing 3 while the gear is running. This vacuum creates an eddy, which supports the flow of leaked oil out of the labyrinth chambers of the seals 6 or the siphon systems 7. Because of the suction, virtually no more gear oil escapes, which is environmentally friendly and assures a constant quantity of oil in the gear casing 3 for a lengthy period of time.

The latter point is particularly crucial for the service life of the gear, because in high-speed gears, the smallest-possible quantity of oil must be used to keep the viscosity of the forming oil-air mixture, and thus its warming tendency, as low as possible, without the gear being destroyed by a lack of oil. A precise control of the oil level without interfering influences of the flow conditions is therefore a further constraint for high-speed driving mechanisms.

Figure 3:
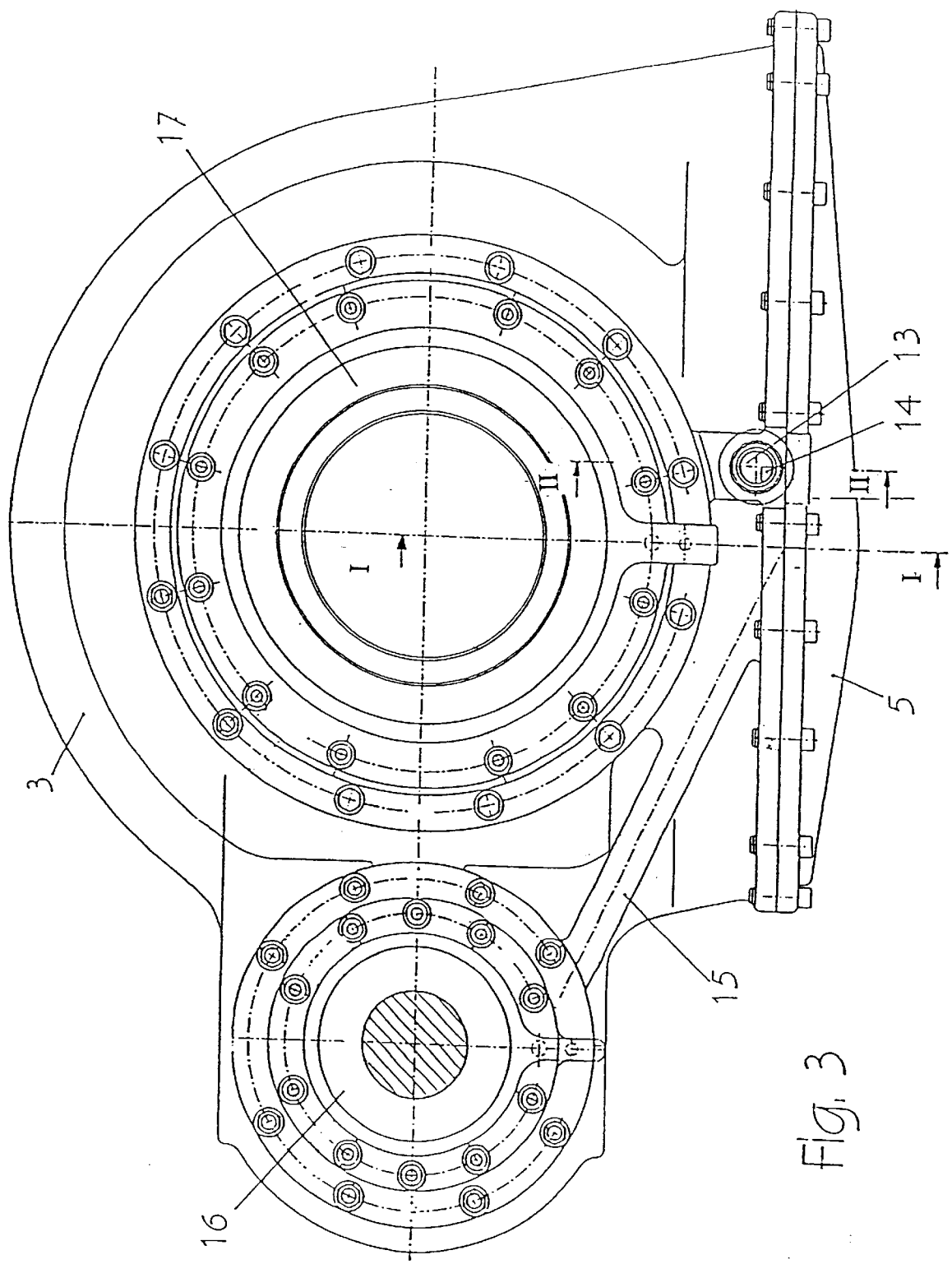
FIG. 3 is a side view of the gear casing in the direction of the axle body.

FIGS. 2 and 3 illustrate a relevant embodiment. According to these depictions, a vertical float bore 11 is provided directly in front of or behind the curve summit of the material buildup in a wall of the gear casing 3; this bore is connected at the bottom to the crankcase 5, and is crossed at the top by a horizontal recess 12, which is sealed toward the outside by a viewing glass 13. The float 14 assists in raising the observation height above the separating seam between the gear casing 3 and the crankcase 5, which approximately coincides with the oil level, without necessitating additional parts that would make the display more costly, or would have a favorable effect on other interfering influences in the flow-sensitive region of the gear interior.

As can be seen from FIG. 3, in an advantageous modification of the invention, the center of gravity of the surface of the oil level coincides exactly with the location of the oil-supply display, which allows the oil supply to be recognized completely independently of whatever tilted position the gear casing 3 may assume.

It can also be seen clearly from FIG. 3 that the oil-recycling ducts 15 are guided from the pinion bearing 16 into the narrow-flow region 10 below the large-wheel bearing 17, so the oil is also suctioned away from the pinion bearing 16 with the use of the Bernoulli effect.

What is claimed is:

1. A high-speed gear arrangement with oil lubrication for environmentally-sealed railway driving mechanisms, including a gear casing with oil-recycling ducts leading out of labyrinth chambers of contactless shaft seals to a crankcase of the gear casing, and wherein the oil-recycling ducts terminate in regions in which a relative vacuum is automatically established during running operation, independently of the direction of rotation of the gear arrangement, with the regions with a vacuum being formed by axial narrow points between a tooth region of a large wheel of the gear arrangement and bordering walls of the gear casing.

2. The high-speed gear arrangement according to claim 1, wherein the narrow points are formed by material buildups in the bordering walls of the gear casing.

3. The high-speed gear arrangement according to claim 2, wherein the material buildups are formed such that a drag current only has small eddy currents in both directions.

4. The high-speed gear arrangement according to claim 1, wherein the labyrinth chambers of the shaft seals are connected to the oil-recycling ducts by a siphon system.

5. The high-speed gear arrangement according to claim 2, wherein the oil-recycling ducts from a bearing for the large-wheel are formed by bores in the material buildups.

6. The high-speed gear arrangement according to claim 2, wherein the oil-recycling ducts from a bearing for a pinion of the gearing arrangement are formed by oil-recycling lines that are formed into the walls of the gear casing.

7. An oil-supply display for a high-speed gear arrangement according to claim 3, wherein a bore that communicates with the crankcase is provided for a float near the peak of a material buildup, with the float being visible through a viewing glass.

8. The oil-supply display according to claim 7, wherein the bore lies in a center of gravity of the surface of the permissible oil-bath level.

* * * * *